Figure 1:
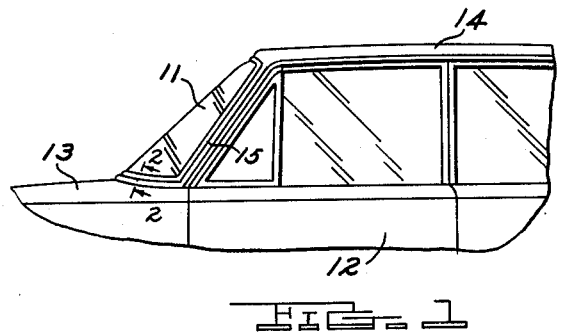

Sept. 29, 1964   M. E. LICKERT   3,150,421
SEALING STRIP
Filed June 15, 1962

MARVIN E. LICKERT
INVENTOR.

BY J. R. Faulkner
J. J. Roethel
ATTORNEYS

United States Patent Office 3,150,421
Patented Sept. 29, 1964

3,150,421
SEALING STRIP
Marvin E. Lickert, Rochester, Mich., assignor to Ford Motor Company, Dearborn, Mich., a corporation of Delaware
Filed June 15, 1962, Ser. No. 202,740
4 Claims. (Cl. 20—56.4)

This invention relates to resilient sealing strip or weather strip assemblies for the installation of immovable glass panels, such as windshields and rear windows, in vehicular body structures or the like.

The conventional sealing strip or weather strip adapted to support and seal a windshield or a rear window in a vehicular body is an elongated rubber strip having a complex arrangement of longitudinally extending sealing lips, ribs and glass panel and body flange receiving grooves or the like. On the assembly line, the fitting of the glass panel edges and of the body flanges into the various grooves and the correct positioning of the various sealing lips is time consuming. Frequently, deviations in sealing strip quality and improper fitting of the sealing strip to the body flanges and glass panels are not noticed by visual inspection. This results in a later customer complaint that the vehicle windshield or rear window mounting leaks when the weather is inclement or when the vehicle is washed.

For esthetic reasons the sealing strip is generally covered by a chrome plated molding. The fitting of this molding requires additional labor and the cost of the molding itself adds expense to the installation.

The weather strip embodying the present invention comprises an improved assembly which: (a) affords more effective weather sealing, (b) lowers the installation cost, and (c) provides improved appearance and minimum wind rush noise by permitting a substantially flush relationship between the window glass and adjacent vehicle body surfaces.

In its preferred embodiment, the present invention is directed to a sealing strip or weather strip assembly having two strip members. One of the strip members, which is preferably made of a plastic material, is provided with one channel or groove for receiving the glass panel and an opposed channel or groove for receiving in interlocking relationship a portion of the second strip member. The second strip member, which is preferably made of a conventional rubber used in weather stripping or sealing strips, is also provided with two channels or grooves, one of which receives a part of the first strip to complete the interlock between the two and the other of which receives a flange on the vehicle body structure. The construction and arrangement is such that the plastic strip member conceals the rubber sealing strip member from view from the outside of the vehicle. The outer exposed surface of the plastic sealing strip member may have an ornamental metallic coating giving it the appearance of a conventional chrome molding strip.

Figure 2:
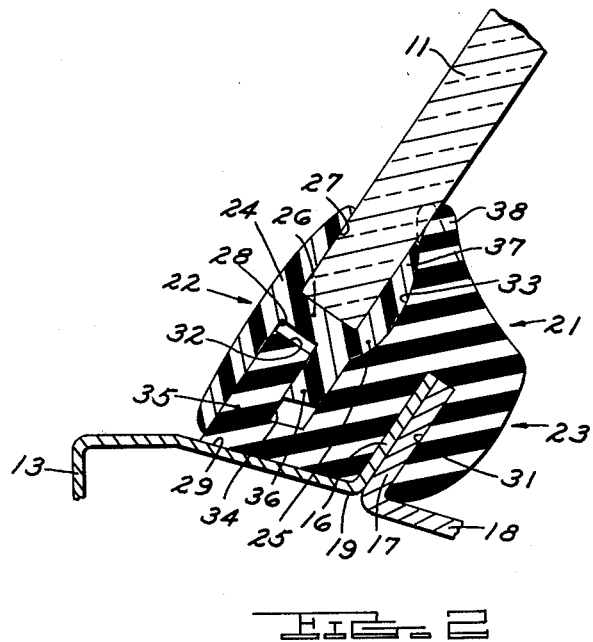

Other objects, features and advantages of the present invention will be made more apparent as this description proceeds, particularly when considered in connection with the accompanying drawings, wherein:

FIG. 1 is a fragmentary side elevational view of a vehicle body having a windshield mounted therein according to the present invention; and FIG. 2 is a cross sectional view taken substantially along the lines 2—2 of FIG. 1.

Referring now to FIG. 1, the sealing strip or weather strip assembly embodying the present invention will be described in its relationship to a windshield 11 installed in a vehicle body 12. The windshield 11 is installed in a body opening defined by a sheet metal cowl panel 13, roof sheet metal structure 14 and side posts 15 extending between the cowl and roof structures. As seen in FIG. 2, the cowl sheet metal 13 terminates in a flange 16 which projects into the windshield opening. The flange 16 is spot welded to a flange 17 which is a terminal portion of the instrument panel 18 of the vehicle structure. Flange 16–17 may hereinafter be referred to as a pinch weld flange. It will be understood that pinch weld flanges corresponding to the flange 16–17 project inwardly into the windshield opening from the side post 15 and the leading edge of the roof sheet metal 14 to provide an anchor for the sealing or weather strip assembly completely around the periphery of the opening.

It will be noted that a section 19 of the cowl sheet metal 13 to which the flange 16 is appended forms with the latter an upwardly facing V-shaped trough.

The sealing or weather strip assembly, generally designated 21, embodying the present invention comprises two elongated strip members 22 and 23, respectively. Strip member 22 comprises an elongate body of plastic material and strip member 23 comprises an elongate body of resilient rubber-like material.

Strip member 22 may be considered as having an outer wall 24 and an inner wall 25, the walls 24 and 25 being joined by a lateral intermediate web 26. The walls 24 and 25 and the web 26 form or define oppositely opening channels 27 and 28.

The width of the channel 27 is such that the strip member 22 will fit snugly over the marginal portion of the glass panel 11. The channel 28 is somewhat narrower than the channel 27 and receives a portion of the strip member 23, as will be more fully explained.

The bottom surface 29 of the strip member 23 sits flush upon the upper surface of cowl sheet metal section 19. The strip member has an upwardly extending channel or groove 31, the walls of which are adapted to tightly engage the pinch weld flange 16–17 to anchor the sealing strip in place. The upper surface of the strip is characterized by a deep recess or rebate at the outer upper corner thereof, the recess or rebate having side walls 32 and 33. At the lower inner corner of the junction of the two side walls 32 and 33, the strip member 23 is provided with a downwardly extending channel or groove 34. This leaves an upwardly extending wall portion 35 at the outer edge of the strip member 23.

The wall portion 35 is of a width such that it will fit snugly into the lower channel 28 of the plastic strip member 22. The groove or channel 34 is of a width such that it will snugly receive the portion 36 of the inner wall 25 of the strip member 22 which forms the inner side wall of the channel 28 therein. In assembled relationship of the two strip members, the channels 28 and 34 and the wall portions 35 and 36 form an interlock which prevents lateral displacement of the strip member 22 from the strip member 23 and thereby lateral displacement of the window glass 11 from the body flange 16–17. It will be noted that the outer surface of the upper portion 37 of the inner wall of the strip member 22 is convexly curved and that the surface 33 of the strip member 22 is concavely curved to provide complementary surfaces between the two strip members. The strip member 23 is also provided with a lip portion 38 which extends into contact with the inner surface of the glass above the upper edge of the inner wall 25 of the strip member 22. The dot-dash outline of the lip 38 illustrates its condition in the free state and the solid outline position illustrates its condition when it is in sealing relationship to the inner surface of the glass.

It will also be noted that sufficient clearance is provided at the bottom of each channel 28 and 34, respectively, to accommodate variations in dimensional size of the window panel. If the window panel is slightly longer in its vertical dimension than it should be, the engagement of the strip member 22 with the strip member 23 may be such that the interlock will show no clearances between the complementary end surfaces of the channels 23 and 34 and the complementary wall portions 35 and 36.

The outer wall 24 of the plastic strip member 22 is of a sufficient length to substantially conceal the strip member 23 when the weather strip assembly is viewed from the outside of the vehicle. To further ornament the assembly, the plastic strip member 22 may be coated with a metallic outer skin. Such coating, of course, plays no part in the effectiveness of the weather strip assembly 21 in mounting the window panel in the vehicle body opening.

It will be understood that the invention is not to be limited to the exact construction shown and described, but that various changes and modifications may be made without departing from the spirit and scope of the invention as defined in the appended claims.

I claim:
1. A window assembly compriisng:
   a structural member having a surface section defining a glass panel receiving opening,
   said structural member having a flange extending into said opening from said surface section;
   a glass panel;
   a first unitary strip member having first and second oppositely opening channels therein,
   said first channel receiving a marginal portion of said glass panel in surface to surface contact therewith;
   and a second strip member comprising an elastomeric body having a base surface in flush relation to said surface section,
   a first groove in said body extending inwardly from said base surface,
   said first groove receiving said flange to hold said body against displacement in a direction laterally of said glass panel receiving opening,
   said body having a rebate at a corner thereof noncontiguous to said base surface,
   a second groove in said body extending from said rebate toward said base portion,
   said rebate providing a seat for said first strip member;
   said second channel and said second groove each receiving portions of said first and second strip members to form an interlock therebetween to hold said panel against lateral displacement from said glass panel receiving opening.

2. A window assembly according to claim 1 in which said second strip member has a lip portion projecting into sealing engagement with the inner surface of said glass panel above the marginal portion thereof received in said first channel of said first strip member.

3. A window assembly comprising:
   a structural member having a surface section defining a glass panel receiving opening,
   said structural member having a flange extending into said opening from said surface section;
   a glass panel;
   a unitary strip member having outer and inner walls joined by a lateral intermediate web,
   said walls and said web forming first and second oppositely opening channels,
   said first channel receiving a marginal portion of said glass panel in surface to surface contact therewith;
   and a second strip member comprising an elastomeric body having a base surface in flush relation to said surface section,
   a first groove in said body at the lower inner corner thereof extending inwardly from said base surface,
   said first groove receiving said flange to hold said body against displacement in a direction laterally of said glass panel receiving opening,
   said body having a rebate at the upper outer corner thereof diagonally oppoiste said lower inner corner,
   a second groove in said body extending inwardly from said rebate toward said base portion,
   said rebate providing a seat for said first strip member;
   said second channel and said second groove each receiving portions of said first and second strip members to form an interlock therebetween to hold said panel against lateral displacement from said glass panel receiving opening.

4. A window assembly according to claim 3 in which said second strip member has a lip portion projecting into sealing engagement with said glass panel above the marginal poriton thereof received in said first channel of said first strip member.

References Cited in the file of this patent
UNITED STATES PATENTS

| | | |
|---|---|---|
| 2,761,535 | Englehart | Sept. 4, 1956 |

FOREIGN PATENTS

| | | |
|---|---|---|
| 562,395 | Great Britain | June 29, 1944 |
| 1,005,389 | Germany | Mar. 28, 1957 |
| 1,219,890 | France | May 20, 1960 |